US012663766B2

(12) United States Patent
Thondarampattu Vasudevan et al.

(10) Patent No.: US 12,663,766 B2
(45) Date of Patent: Jun. 23, 2026

(54) SYSTEM AND METHOD FOR CORRECTIVE ACTION TO ACHIEVE BASELINE CONDITION

(71) Applicant: Körber Supply Chain LLC, DFW Airport, TX (US)

(72) Inventors: Vimalanath Thondarampattu Vasudevan, Lewisville, TX (US); Jerome Vaughan, Highland Village, TX (US)

(73) Assignee: Körber Supply Chain LLC, DFW Airport, TX (US)

(*) Notice: Subject to any disclaimer, the term of this patent is extended or adjusted under 35 U.S.C. 154(b) by 530 days.

(21) Appl. No.: 18/163,571

(22) Filed: Feb. 2, 2023

(65) Prior Publication Data

US 2023/0244192 A1 Aug. 3, 2023

Related U.S. Application Data

(60) Provisional application No. 63/306,235, filed on Feb. 3, 2022.

(51) Int. Cl.
*G05B 13/04* (2006.01)
*G05B 23/02* (2006.01)

(52) U.S. Cl.
CPC ....... *G05B 13/048* (2013.01); *G05B 23/0221* (2013.01)

(58) Field of Classification Search
CPC ........................... G05B 13/048; G05B 23/0221

USPC ........................................................... 700/29
See application file for complete search history.

(56) References Cited

U.S. PATENT DOCUMENTS

| | | | | |
|---|---|---|---|---|
| 2014/0183103 | A1* | 7/2014 | Kadali .................... | C10G 1/047 |
| | | | | 196/14.52 |
| 2019/0108471 | A1* | 4/2019 | Widanapathirana ......................... | |
| | | | | G06Q 10/063114 |
| 2021/0286348 | A1* | 9/2021 | Jalluri ................. | G05B 19/4063 |
| 2022/0365525 | A1* | 11/2022 | Minisankar ............ | G06N 20/00 |
| 2023/0160783 | A1* | 5/2023 | Houston ................. | G10L 25/63 |
| | | | | 381/56 |

* cited by examiner

*Primary Examiner* — Jigneshkumar C Patel
(74) *Attorney, Agent, or Firm* — Price Heneveld LLP

(57) ABSTRACT

A system, method, and medium for corrective action to achieve baseline condition including a communication component and a processor. The communication component receives input data associated with one or more operating conditions of an equipment utilized for baseline activity and captures baseline data relating to a system baseline associated with a corrective action recommendation. The processor predicts an optimal operating condition based on at least one of a statistical model, a mathematical model, or a machine learning model of the equipment and determine the corrective action recommendation based on the optimal operating condition. The corrective action recommendation is associated with the system baseline. The processor also detects one or more anomalies from the baseline data deviating from the system baseline beyond a predetermined range, and re-evaluates the optimal operating condition based on the anomaly or anomalies.

20 Claims, 14 Drawing Sheets

100

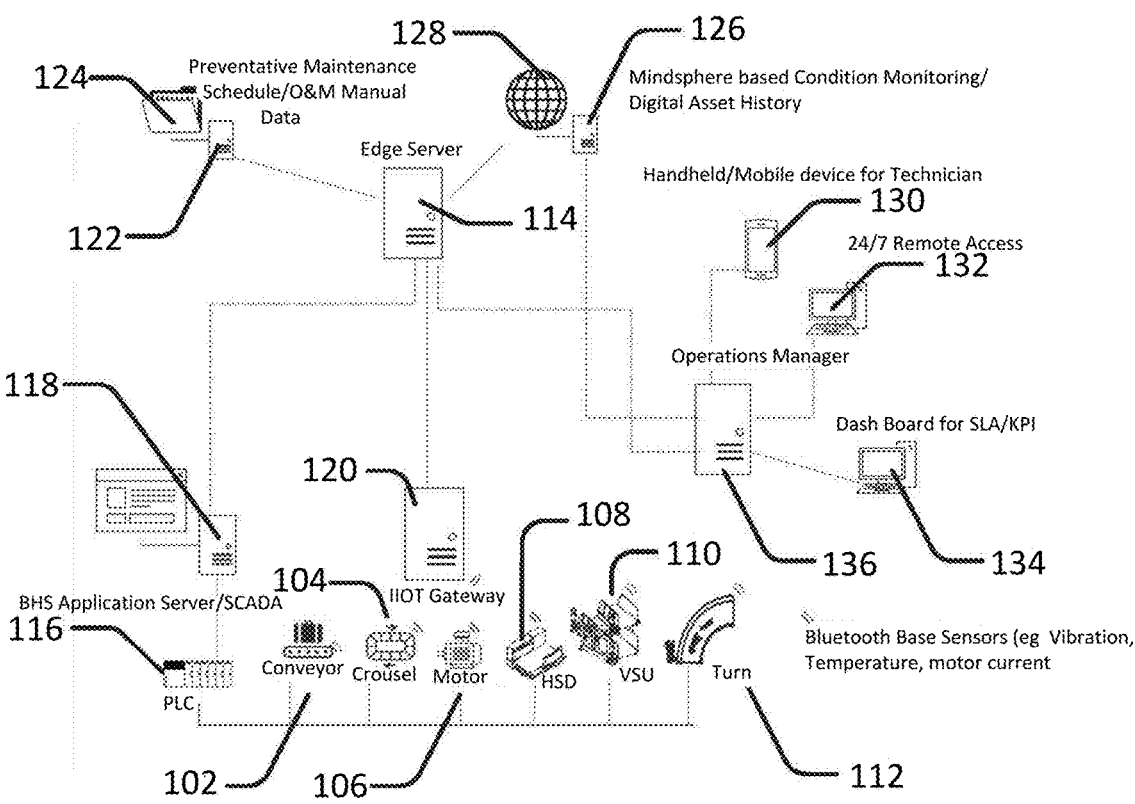

128      126

124   Preventative Maintenance Schedule/O&M Manual Data

Mindsphere based Condition Monitoring/ Digital Asset History

Edge Server

Handheld/Mobile device for Technician 122    114    130

24/7 Remote Access

132

Operations Manager

118

120

Dash Board for SLA/KPI

108

110

136    134

BHS Application Server/SCADA

104   IIOT Gateway

116

Conveyor   Crousel   Motor   HSD   VSU   Turn

PLC

Bluetooth Base Sensors (eg Vibration, Temperature, motor current 102    106    112

Fig. 1

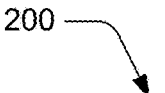
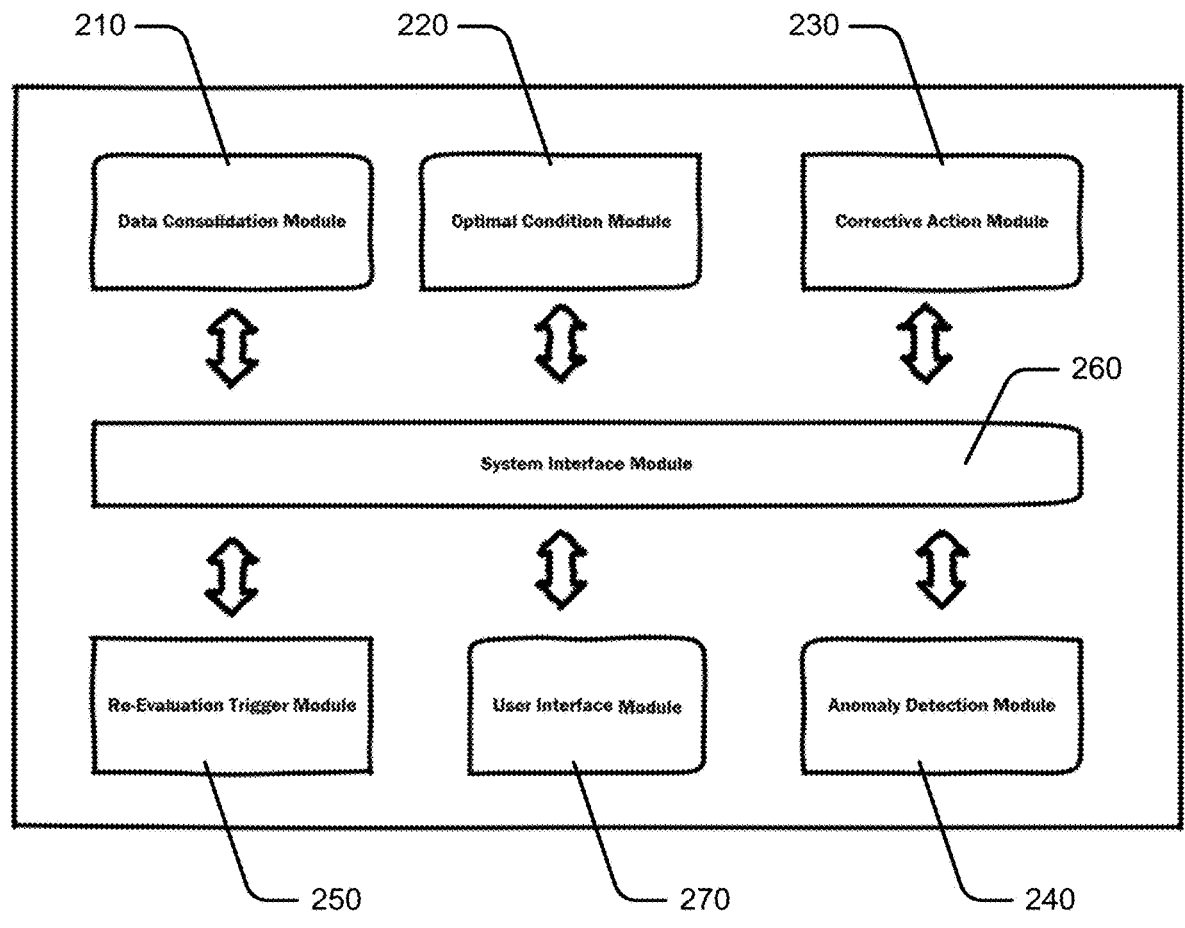
Fig. 2

210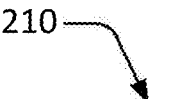
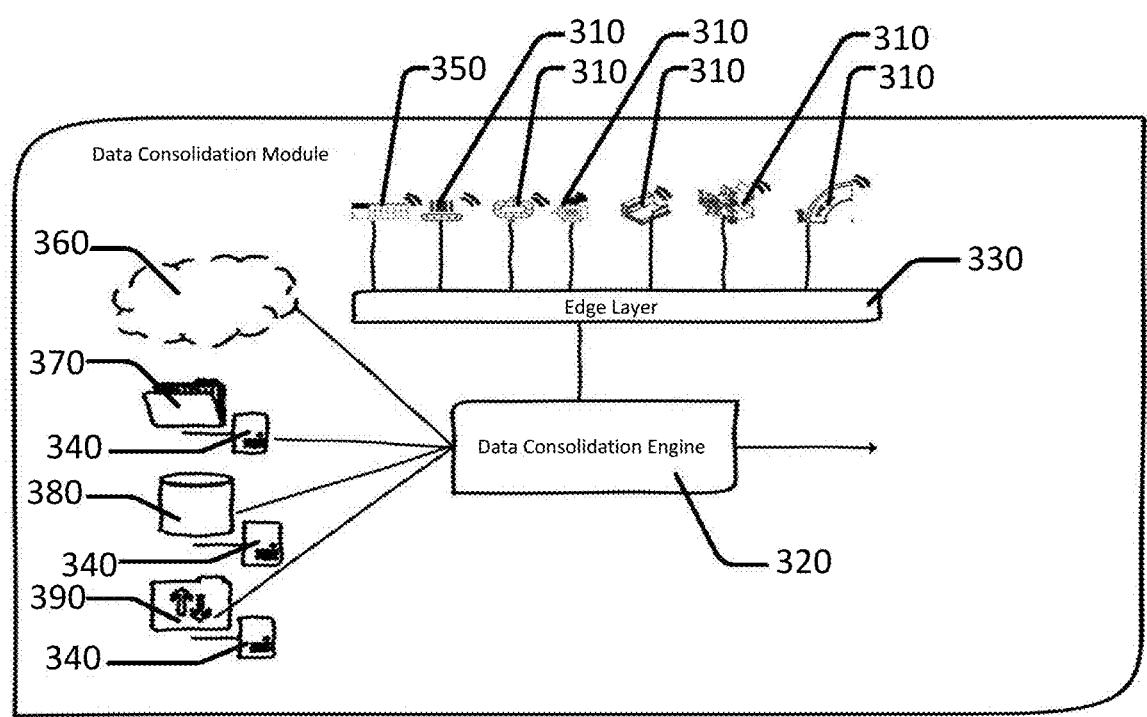
Fig. 3

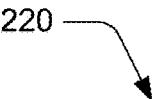
220
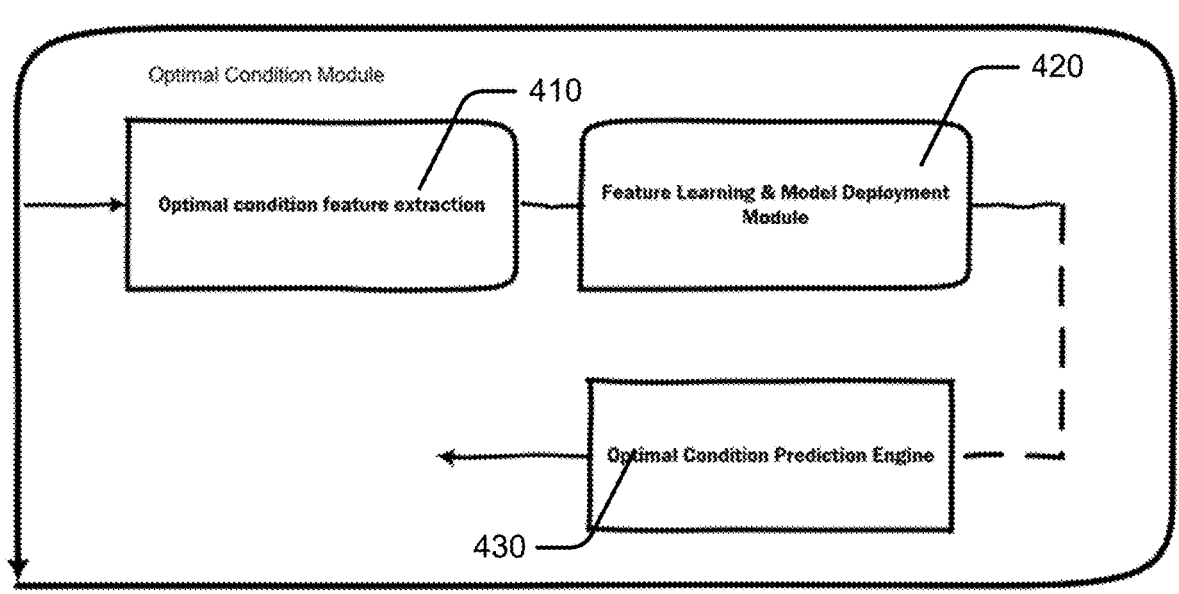
Optimal Condition Module
Optimal condition feature extraction — 410
Feature Learning & Model Deployment Module — 420
Optimal Condition Prediction Engine
430
Fig. 4

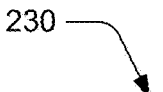
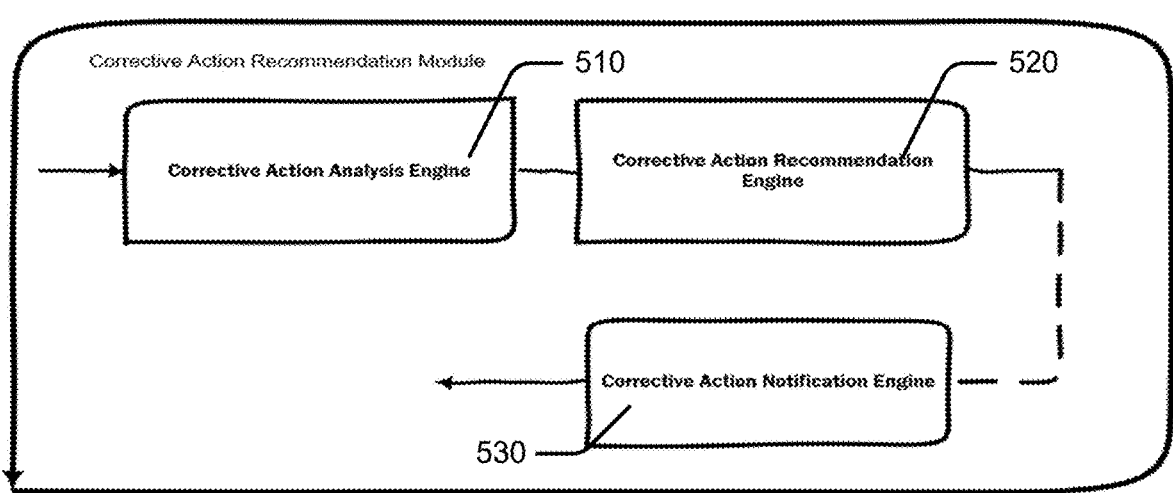
Fig. 5

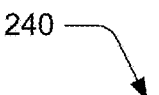
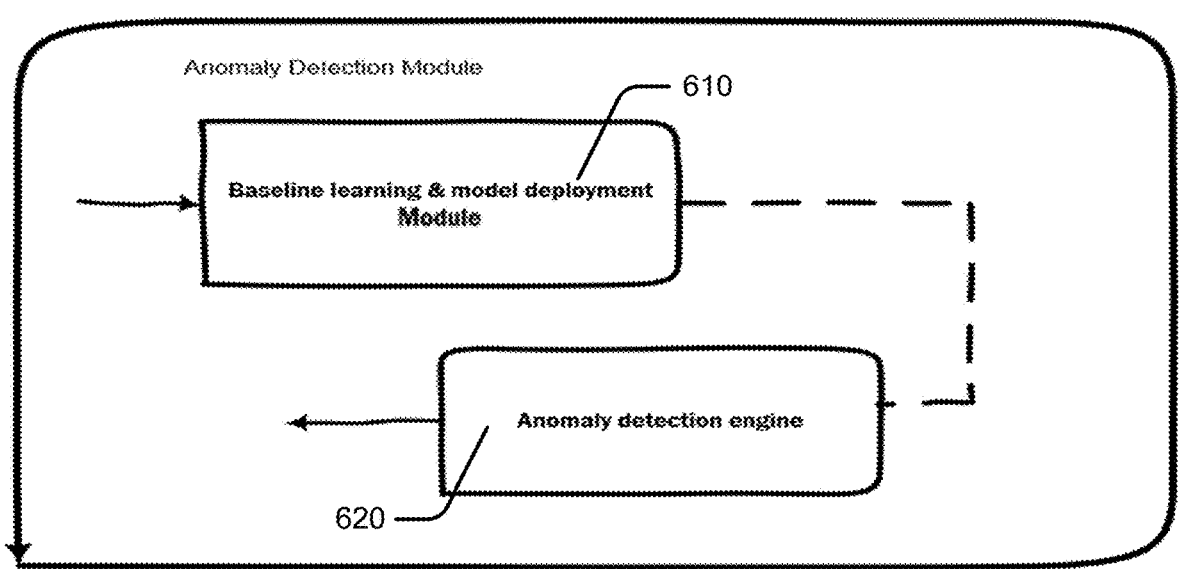
Fig. 6

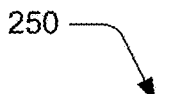
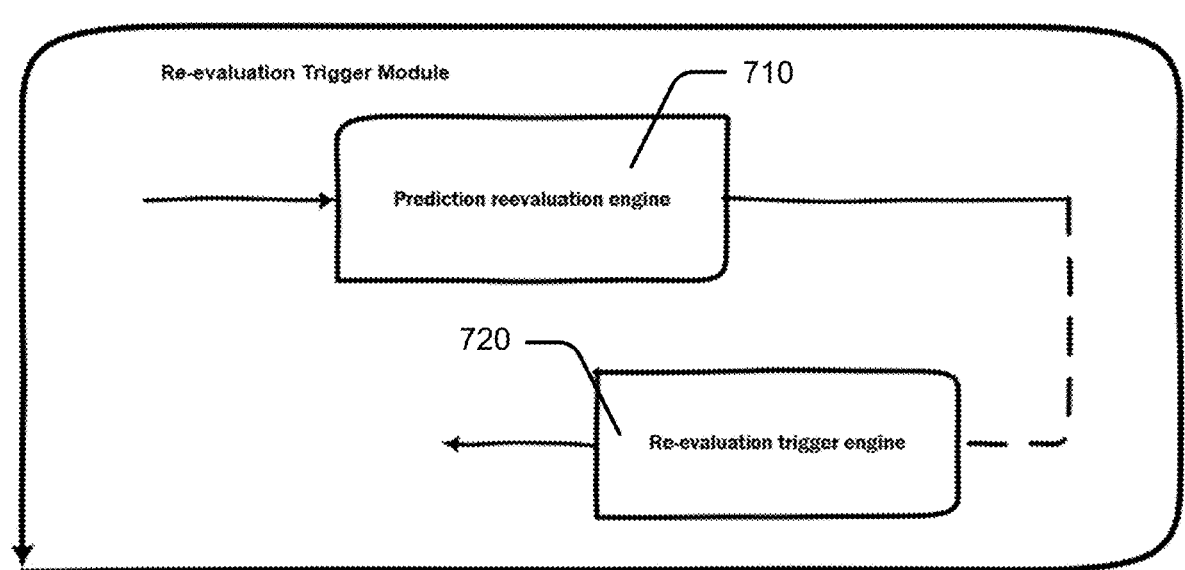
250
Re-evaluation Trigger Module
710
Prediction reevaluation engine
720
Re-evaluation trigger engine
Fig. 7

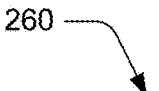
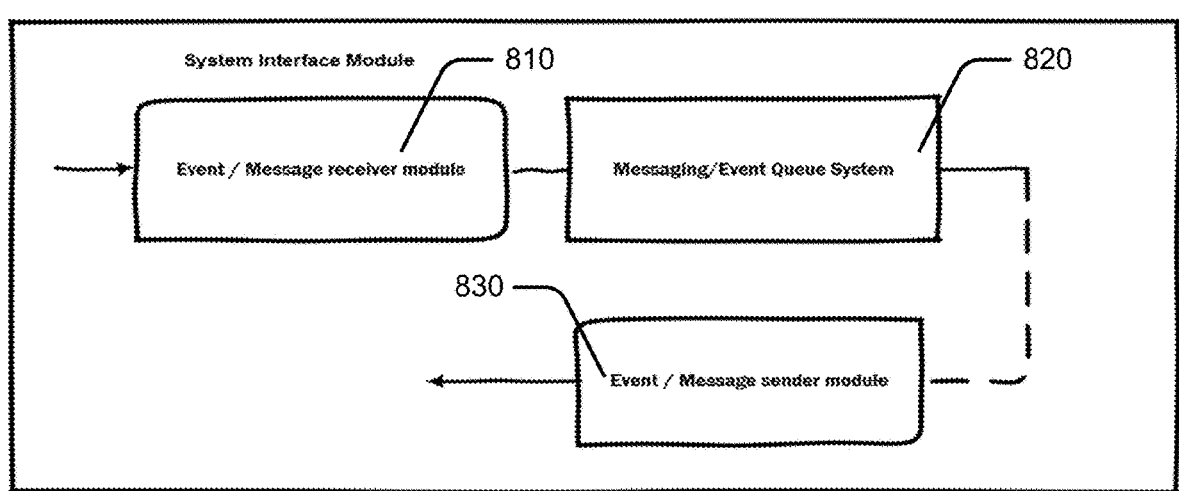
Fig. 8

270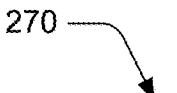
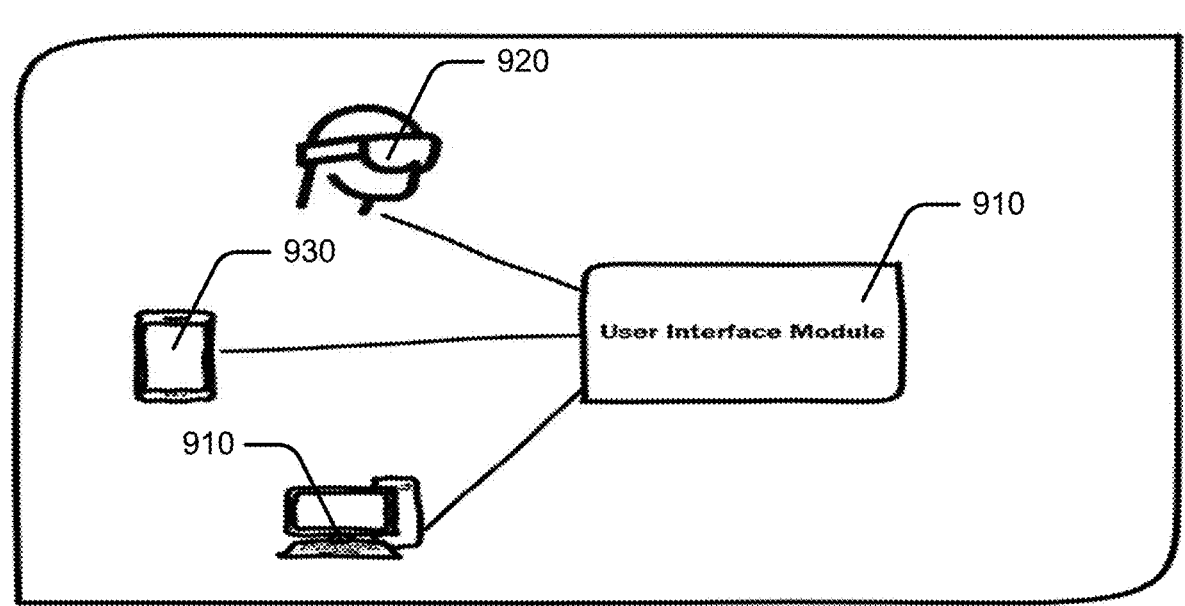
Fig. 9

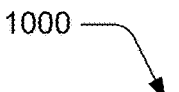
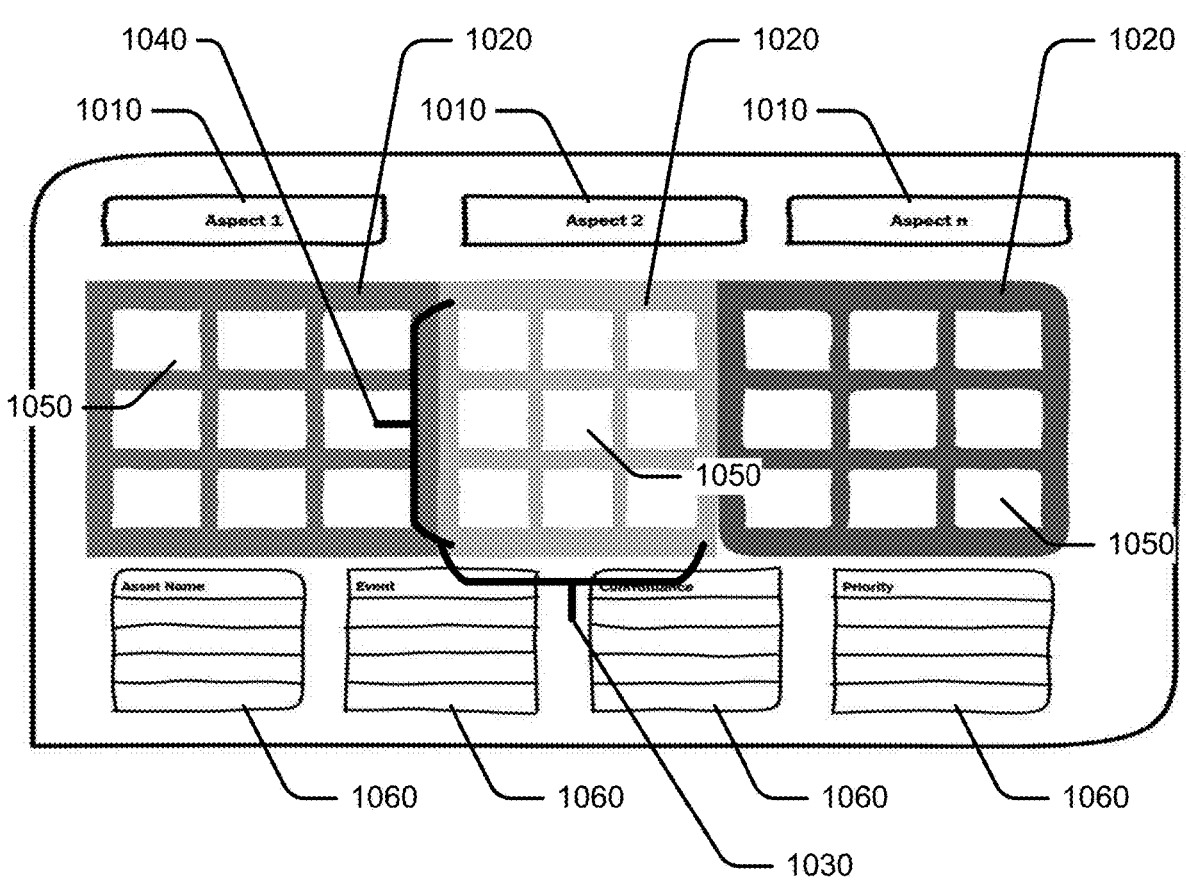
Fig. 10

1100

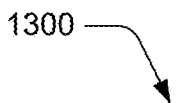
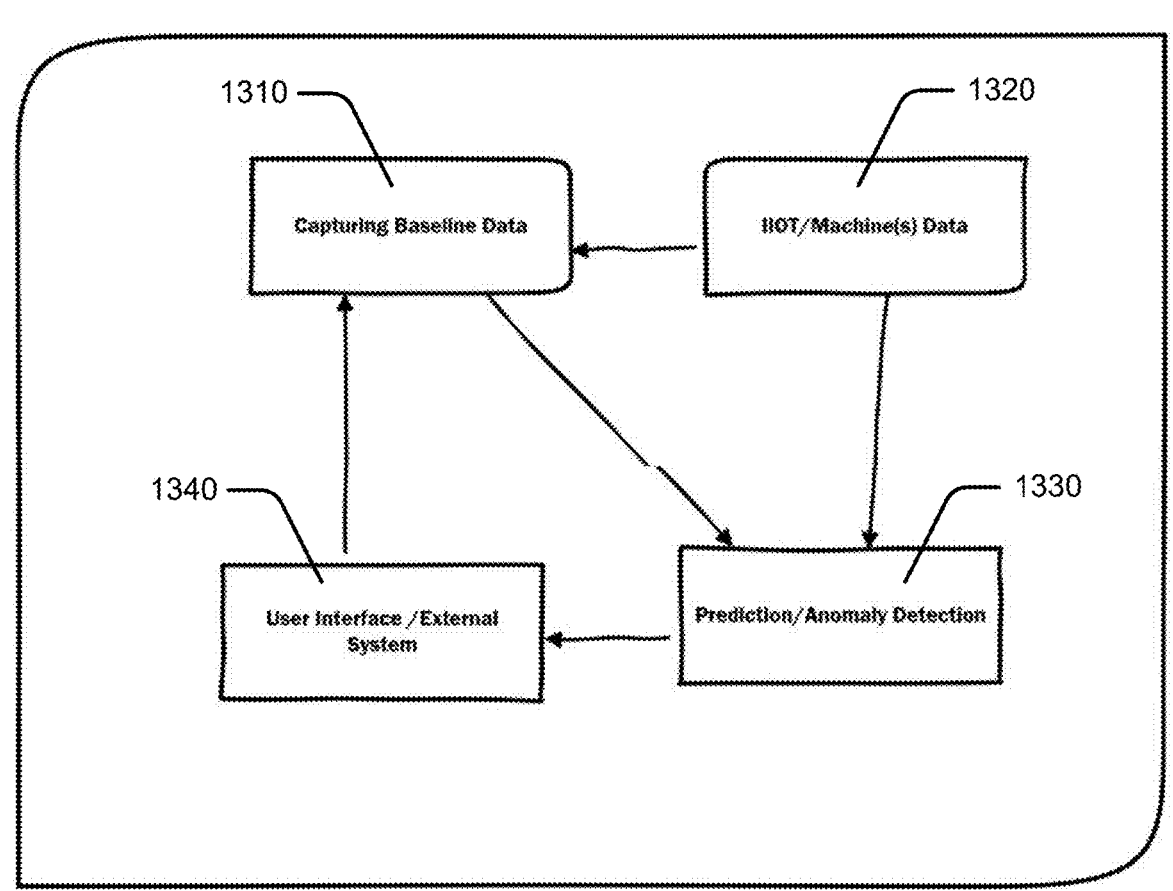
Fig. 13

1400

SYSTEM AND METHOD FOR CORRECTIVE ACTION TO ACHIEVE BASELINE CONDITION

CROSS-REFERENCE TO RELATED APPLICATIONS

This application claims the benefit of U.S. Provisional Patent Application No. 63/306,235, entitled "SYSTEM AND METHOD FOR CORRECTIVE ACTION TO ACHIEVE BASELINE CONDITION," filed on Feb. 3, 2022, the entire disclosure of which is incorporated herein by reference.

FIELD OF THE INVENTION

This application relates to the field of systems and methods to avoid unwanted preventive maintenance and cost of industrial equipment and, more particularly, to condition-based predictive maintenance models that utilize one or more artificial intelligence/machine learning ("AI/ML") systems.

BACKGROUND

Many systems and methods use technology to avoid unwanted preventive maintenance and cost, particularly downtime, for industrial equipment. Condition-based predictive maintenance models are often used and accepted across many industries to avoid such conditions and costs. Predictive maintenance models may include one or more artificial intelligence/machine learning ("AI/ML") systems, which require training under baseline conditions to determine normal or anomalies for determining early warning signs. Such models may use an industrial internet of things ("IIOT") based AI/ML system to industrial applications. One of the key challenges is to determine what is the expected optimal condition of the machine or equipment that forms the baseline.

Predictive maintenance programs based on IIOT and AI/ML typically fail to detect system anomalies due to improper system baseline conditions or assuming operating conditions as optimal conditions for the system. Conventional IIOT based predictive maintenance systems do not have the automated ability to validate greenfield or brownfield installation for expected optimal condition and provide a recommendation to achieve it.

Conventional systems leave the determination of a baseline condition to a system operations/maintenance team, uses static pre-defined baseline based on a factory condition, or assumes current operating state is an optimal baseline state. These conventional approaches result in inaccurate predictions of maintenance condition/change in a system condition. In some cases, highly qualified reliability engineers are needed to validate the system using conventional methods to baseline brownfield or greenfield system. Conventional approaches utilize a static baseline condition and ignore considerations of constantly changing baseline condition due to various operating and other site conditions.

SUMMARY

In accordance with one embodiment of the disclosure, there is provided a corrective action approach to achieve baseline condition. A fully automated system collects multiple systems/machine condition data on-site and converts analyzed data as a desired optimal system(s)/machine(s)

condition. The system takes into consideration constantly changing baseline conditions due to various operating and other site conditions. In doing so, the system removes the subjectiveness in baselining for condition monitoring and gives objective analysis across various site conditions. In contrast to conventional methods, the system moves from predictive to prescriptive maintenance and eliminates the dependency of experts to determine the optimal operating condition of the system. The system and method may be used as a tool to validate system installation in greenfield and/or as a diagnostic tool in brownfield.

One aspect is a system for corrective action to achieve baseline condition comprising a communication component and a processor. The communication component is configured to receive input data associated with one or more operating conditions of an equipment utilized for baseline activity and capture baseline data relating to a system baseline associated with a corrective action recommendation. The processor is configured to predict an optimal operating condition based on at least one of a statistical model, a mathematical model, or a machine learning model of the equipment and determine the corrective action recommendation based on the optimal operating condition. The corrective action recommendation is associated with the system baseline. The processor is also configured to detect one or more anomalies from the baseline data deviating from the system baseline beyond a predetermined range, and re-evaluate the optimal operating condition based on the anomaly or anomalies.

Another aspect is a method for corrective action to achieve baseline condition. Input data associated with one or more operating conditions of an equipment utilized for baseline activity is received. An optimal operating condition is predicted based on at least one of a statistical model, a mathematical model, or a machine learning model of the equipment. A corrective action recommendation is determined based on the optimal operating condition in which the corrective action recommendation is associated with a system baseline. Baseline data relating to the system baseline associated with the corrective action recommendation is captured. One or more anomalies of the baseline data deviating from the system baseline beyond a predetermined range are detected. The optimal operating condition is re-evaluated based on the anomaly or anomalies.

Yet another aspect is a non-transitory computer readable medium including executable instructions which, when executed, causes one or more processors to execute corrective action to achieve baseline condition. Input data associated with one or more operating conditions of an equipment utilized for baseline activity is received. An optimal operating condition is predicted based on at least one of a statistical model, a mathematical model, or a machine learning model of the equipment. A corrective action recommendation is determined based on the optimal operating condition in which the corrective action recommendation is associated with a system baseline. Baseline data relating to the system baseline associated with the corrective action recommendation is captured. One or more anomalies of the baseline data deviating from the system baseline beyond a predetermined range are detected. The optimal operating condition is re-evaluated based on the anomaly or anomalies.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIG. 1 is a block diagram illustrating an environment in an example implementation that is operable to employ techniques described herein;

FIG. 2 is a block diagram of an overall system in an example implementation that is operable to employ the techniques described herein;

FIG. 3 is a block diagram of a data consolidation module of the system of FIG. 2 in an example implementation;

FIG. 4 is a block diagram of an optimal condition module of the system of FIG. 2 in an example implementation;

FIG. 5 is a block diagram of a corrective action module of the system of FIG. 2 in an example implementation;

FIG. 6 is a block diagram of an anomaly detection module of the system of FIG. 2 in an example implementation;

FIG. 7 is a block diagram of a re-evaluation trigger module of the system of FIG. 2 in an example implementation;

FIG. 8 is a block diagram of a system interface module of the system of FIG. 2 in an example implementation;

FIG. 9 is a block diagram of a user interface module of the system of FIG. 2 in an example implementation;

FIG. 10 is a diagrammatic view of a main screen of the user interface module of FIG. 9 in an example implementation;

FIG. 13 is a block diagram of a system to determine desired baseline condition and prescribe corrective action to achieve a baseline condition in an example implementation that is operable to employ the techniques described herein.

DETAILED DESCRIPTION

Figure 11:
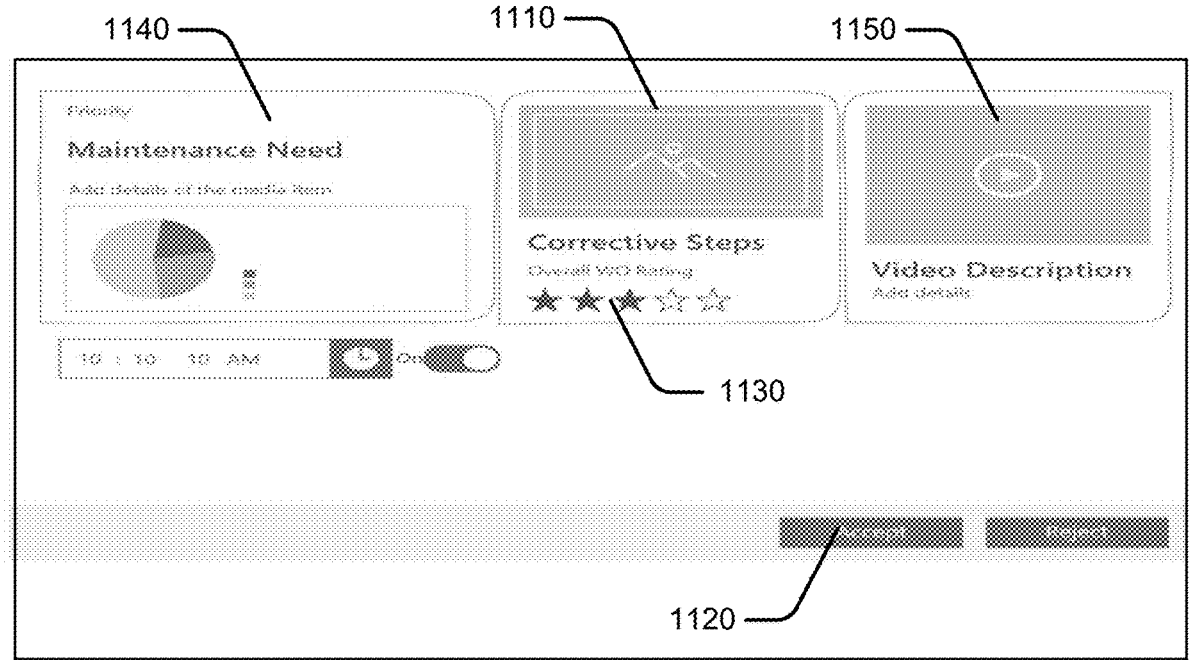
FIG. 11 is a diagrammatic view of a corrective action recommendation of the corrective action module in an example implementation.

Various technologies that pertain to systems and methods that facilitate corrective action to achieve baseline conditions will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. The specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The system 100 (FIG. 1) determines a desired baseline condition and prescribes corrective action to achieve the baseline condition. The system 100 outputs collected data as a predicted optimal operating condition for specific machines and systems. By computing a desired optimal condition, the system 100 determines the condition at which system baseline may be performed for condition monitoring, anomalies detection, and predictive maintenance systems. The system 100 also recommends the corrective action required to achieve the optimal condition which may be a key requirement to start the baseline process for condition monitoring. The system 100 may also be used as a diagnostic tool in brownfield and a validation tool in greenfield installation.

FIG. 1 is a block diagram illustrating an environment in example implementation that is operable to employ techniques described herein. Referring to FIG. 1, there is shown an architecture overview of the system 100 to determine a baseline condition and prescribe corrective action to achieve the baseline condition. The system 100 performs condition monitoring as part of maintenance and operation of industrial equipment, such as various components of a baggage or parcel handling unit. The system 100 monitors and checks parameters, such as vibration, temperature, and motor current, using sensing components such as conveyors 102, carousels 104, motors 106, diverters 108, sorting units 110, turn units 112, merge units, and other baggage and/or parcel handling equipment. For example, baggage handling equipment may include a high speed diverter 108, a vertical sort/merge unit 110, and special conveyors 112 for turn and merge of baggage.

The system 100 also includes one or more computing devices to determine a baseline condition and prescribe corrective action to achieve the baseline condition. In particular, the system 100 includes an edge server 114 to receive data from the sensing components 102-112 and performs analysis on the data. The edge server 114 may receive the data from the sensing components 102-112 via a wired link, a wireless link, or a combination of wired and wireless links. For example, the system 100 may include a programmable logic controller ("PLC") 116 having a wired connection to the sensing components 102-112 and communicates control and data signals between the edge server 114 and the sensing components. For some embodiments, the system 100 may further include a baggage handling system ("BHS") application server and/or supervisory control and data acquisition server ("SCADA") 118 to control processes locally, such as monitoring, gather, and processing real-time data of the sensing components 102-112. As another example, the system 100 may include an IIOT gateway 120 having a wireless connection (such as Bluetooth, Wi-Fi, or the like) to the sensing components 102-112 for gathering and/or processing real-time data. For some embodiments, the edge server 114 may also receive data from other internal sources 122, such as a server storing preventive maintenance schedule and O&M manual data 124. For some embodiments, the edge server 114 may also receive data from external sources 126, such as a remote condition monitoring and/or digital asset history server, via an external network connection 128. For some embodiments, the system 100 may further provide access to collected and/or analyzed data to external user devices, such as a mobile device 130, a remote terminal 132, and/or a remote monitoring system 134 of service level, key performance indicators, and the like.

The system 100 collects data from the various equipment 102-112 and performs analysis on the data. If the system 100 identifies one or more problems based on data that deviates from a normal condition, the system 100 may initiate the self-learning subsystem to address the problem or problems. A baseline model determines and recommends, automatically and objectively, a potential baseline for the system 100 based on the collected data. The baseline model recommends to the system 100 corrective action to bring any equipment 102-112 outside of the potential baseline back to a baseline condition. Thereafter, a condition monitoring subsystem activates to record data incoming from the equipment 102-112 and the baseline model is created. Also, equipment conditions may change so the system 100 may re-evaluate the optimal condition based on new data, adjust the baseline condition, and learn/provide an updated recommendation, such as steps needed to perform the appropriate change. The system 100 may also tag conditions for potential repair, for example, cleaning a motor head or fixing a particular portion of a conveyor.

Referring to FIG. 2, there is shown a block diagram of a modular system 200 in an example implementation. FIG. 2 represents a logical model where all modules may be supported by a single computing device, or the modules may be distributed among multiple computing devices. For example, all modules may be located at the edge server 114 of FIG. 1 or some modules may be located at the edge server while other modules may be located at one or more of the other devices 118, 120, 126, 136, and the like.

The system 200 includes multiple modules, including two or more modules selected from a group consisting of a data consolidation module 210, optimal condition module 220, corrective action module 230, anomaly detection module 240, re-evaluation trigger module 250, system interface module 260, and/or a user interface module 270. For the system 200, an interface operator, a maintenance technician, or an external system may select the preferred aspect of the equipment, such as systems or machines, for which optimal conditions need to be determined. Optional attributes, such as manufacturer recommendations, industry recommendations, model, size, etc., may be used by the system 200 to determine desired optimal conditions one or more parts of the overall system and recommendations to achieve the conditions. Selections may be entered using the user interface module 270, and optimal conditions may be determined by the optimal condition module 220.

Based on ongoing condition monitoring and/or predictive maintenance monitoring system results, the system 200 re-evaluates the suggested optimal condition if the baseline needs to be redefined due to aging and operational condition change. For example, the re-evaluation process of an optimal condition, determined by the optimal condition module 220, may be activated by the re-evaluation trigger module 250. The data consolidation module 210 may consolidate and collect multiple sources of multiple equipment condition data, including IIOT/OT data, structure/unstructured (Big) data source on-premises or in the cloud. The data may be analyzed by the system 200 and outputted at the user interface module 270 as predicted optimal system condition desired for specific site/installation.

Based on the prediction, the system 200 may analyze how far monitored equipment, such as systems or machines, are from the desired condition and recommend specific action needed to achieve the desired condition. The anomaly detection module 240 may detect monitored conditions that exceed desired conditions, and the corrective action module 230 may determine the recommended and/or corrective action in order to achieve the desired condition. Once desired condition is met, the system 200 generates a notification which may be used as a trigger for baselining activity by the re-evaluation trigger module 250 or another component. The system interface module 260 provides a common medium for communication of data and commands between two or more modules 210-250, 270 of the system 200 and, for some embodiments, provides additional processing capabilities of the data and/or commands. The reliability of the condition monitoring and the predictive maintenance model increases, and predictions are more reliable in response to training on the optimal condition.

The system 200 also provides additional benefits, such as by acting as a tool to analyze brownfield conditions to fix issues before implementing a predictive maintenance system. Accordingly, the system 200 does not merely assume every functionally operating equipment is in its optimal operational condition free of any installation or maintenance issue. In addition to predictive maintenance, the system 200 performs prescriptive maintenance.

Referring to FIG. 3, there is shown a block diagram of the data consolidation module 210 in an example implementation. The data consolidation module 210 is responsible for performing data aggregation from all available data sources 310 for condition monitoring and system data. The data consolidation module 210 includes a data consolidation engine 320 that has various connectors 330, such as an edge layer, and data modeling modules 340 to interface with different industrial protocols and systems. The data consolidation module 210 ingests structured and unstructured equipment time series data. For some embodiments, the data consolidation module 210 may include a PLC 350 to facilitate communications of control and data signals between the data consolidation engine 320 and the data sources 210, such as the sensing components 102-112 shown in FIG. 1. For some embodiments, the data consolidation module 210 may convert data to required and compressed formats for optimal transmission from edge to cloud (represented by 360). The data modeling modules 340 may provide information from local sources such as folders 370, databases 380, and/or other transfer media 390 of the computing components of the system 200.

The data consolidation module 210 ingests structured and/or unstructured documentation data, such as specification, documentation, maintenance manual, and training videos with metadata. Examples of such documentation data include, but are not limited to, structured equipment time series data, unstructured equipment time series data, maintenance data, equipment specifications, equipment documentation, system metadata, equipment metadata, operational data, and seasonality data. The data consolidation module 210 ingests the list of asset criticality rank information in which assets are ranked based on their impact in the operation upon failure. The data consolidation module 210 has Big data and optimized time-series storage capabilities, which may run at edge/cloud at the same time depending on the location on the various data source. The data ingestion by the data consolidation module 210 may occur in real-time or offline. In response to ingesting the data, the data consolidation module 210 provides access to the data to other modules in the system 200 via the system interface module 260.

Referring to FIG. 4, there is shown a block diagram of the optimal condition module 220 in an example implementation. The optimal condition module 220 includes an optimal condition feature extraction component 410 that extracts features from the consolidated data of the data consolidation module 210 and a feature learning and model deployment module 420 that builds a model with extracted features. The system 200 may determine optimal conditions for individual equipment, such as systems or machines, based on the model. For example, for some embodiments, the optimal condition module 220 may include an optimal condition prediction engineer 430 to determine one or more optimal conditions. If the equipment operates in the desired condition, the optimal condition module 220 may confirm by a conformance flag. The optimal condition module 220 may indicate that the equipment does not operate in the desired condition by a non-conformance flag. In addition to non-conformance, the system 200 may also send confidence level of the non-conformance decision. Depending upon one or more selected options of the user interface module 270, the optimal condition module 220 may validate conformance at a machine level, system level, and/or entire site level. For some embodiments, the optimal condition module 220 may compute the worst performance ranking among the non-conformant asset. For some embodiments, the optimal condition module 220 may mark seasonal non-conformance assets, which happen only at a particular time or season. The predicted optimal conditions and their conformance data are ingested by data consolidation module 210 and available to other modules via the system interface module 260.

Referring to FIG. 5, there is shown a block diagram of the corrective action module 230 in an example implementation. The corrective action module 230 extracts the information for non-conformance equipment. The corrective action module 230 may include a corrective action analysis engine 510 to analyze and/or otherwise associate data from data consolidation module 210 via the system interface module 260. For example, the corrective action analysis engine 510 of the corrective action module 230 may determine a difference between actual vs predicted conditions. The corrective action module 230 may prioritize the corrective action based on criticality ranking and seasonality based on ingested documents and data. The corrective action module 230 may also include a corrective action recommendation engine 520 to recommend the corrective action based on site-specific ingested computerized maintenance management system ("CMMS") data. The corrective action may relate to documentation using single or multiple mediums, such as text, video, and/or audio. Each corrective action will have symptoms, problem description, and corrective action steps along with reference metadata. The system 200 includes a self-ranking system after every time it receives corrective action completed notification from the CMMS system. The corrective action module 230 further includes a corrective action notification engine 530 to provide one or more notifications to other modules via the system interface module 260. If there is any additional corrective action taken, the system 200 updates that information to data consolidation module 210 for future recommendation. The corrective action module 230 may also calculate the cost of corrective action and/or the cost saved by preventing the failure which, for some embodiments, may be referenced to charge a customer based on the value created and display potential savings. The corrective action module 230 may also run a corrective action verification module to make sure changes have restored the condition to desired optimal condition. If changes have not restored the condition, then the system 200 marks the asset as non-conformant and provides a rating of a CMMS corrective action work order.

Referring to FIG. 6, there is shown a block diagram of the anomaly detection module 240 in an example implementation. The anomaly detection module 240 is the main condition monitoring or predictive maintenance unit. In response to approval and completion of the corrective actions, the anomaly detection module 240 receives an event notification from the correction action module 230. The anomaly detection module 240 includes a baseline learning and model deployment module 610 to start the baseline and deploy the trained model from baseline data for anomaly detection and predictive maintenance notification in response to receiving the even notification. The anomaly detection module 240 also includes an anomaly detection engine 620 to detect anomalies based on the baseline model and prescribe a prediction that requires preventive maintenance steps based on the information from the corrective action module 230.

Referring to FIG. 7, there is shown a block diagram of the re-evaluation trigger module 240 in an example implementation. The re-evaluation trigger module 240 includes a prediction re-evaluation engine 710 and a re-evaluation trigger engine 720. The prediction re-evaluation engine 710 of the re-evaluation trigger module 240 periodically validates performance of equipment, such as an agency debit memo ("ADM") based on work order information, such as CMMS data. If a manual work order is created for a particular equipment and the system 200 has not detected the issue, then the issue is counted against the performance of the particular equipment. Work orders are created based on corrective action module events. Work orders closed as non-issue will be counted against the performance of the corresponding equipment. A work order initiated by the correction action module 230 has higher confidence level based on previously closed work order and still the work order is not completed properly, then the work order performance will be impacted. Where the performance trends downward, the system 200 will issue a trigger to initiate an action by the optimal correction module 220 again. Any count against the performance of equipment may cause the re-evaluation trigger engine 720 to activate the re-evaluation process.

Referring to FIG. 8, there is shown a block diagram of the system interface module 260 in an example implementation. For example, the system interface module 260 may be a communication bus or a network providing communications among the modules. The system interface module 260 includes an event/message receiver module 810 to receive events/messages, a message/event queue system 820 to manage incoming events/messages, and an event/message sender module 830 to provide events/message and/or related information to other modules. The system interface module 260 acts as a bridge between all modules to access the data and provides an interface to any external system and the user interface module 270. The system interface module 260 provides an interface for all other modules to communicate between them and to communicate with any external system. The system interface module 260 may operate on edge/cloud depending on on-site requirements. For some embodiments, the system interface module 260 may use serialization and compression techniques to transfer data in a cost-efficient manner. The system interface module 260 may also be responsible for long-term data archival and retrieval of data for DCN from long-term storage. For some embodiments, the system interface module 260 may allow data and models accessible to a third-party system in a metered fashion for a charge or no charge. The system interface module 260 may communicate with other SIM modules in other sites to do a network-wide prediction by designating the manager instance of the module.

Referring to FIG. 9, there is shown a block diagram of the user interface module 270 in an example implementation. The user interface module 270 includes a user interface component 910 that may display content in various formats of linked devices. Examples of devices include, but are not limited to, workstations 910, augmented reality/virtual reality ("AR/VR") devices 920, and mobile device 930. For some embodiments, the user interface module 270 may display recommendations of the corrective action module 230 in the form of heatmap with priority highlighted in color-coded format. For some embodiments, recommendations of the corrective action module 230 may be sent as text notification, iMessage, WhatsApp, or similar messaging technology. For some embodiments, the results of the corrective action module 230 may display using AR/VR devices as an overlay with instructions on the asset.

Referring to FIG. 10, there is shown a diagrammatic view of a main screen 1000 of the user interface module 270 in an example implementation. The main screen 1000 of the user interface module 270 may be configured in a variety of ways, such as a dashboard, and is not restricted to the layout shown in FIG. 10. The main screen 1000 includes one or more aspects 1010 of the industrial equipment for the system 200. Examples of aspects 1010 include, but are not limited to, temperature, vibration, motor current, visual for a camera subsystem, sound for an audio subsystem, and the like. For example, in the case of a baggage or parcel handling system, a conveyor layer may be shown in the form of a grid 1020 that is color-coded and presented for each aspect, such as thermal analysis, vibration analysis, and motion anomaly. For some embodiments, each grid may present an aspect for multiple equipment in which the x-axis 1030 represents locations at a facility (such as a ticket counter) and the y-axis 1040 represents conveyor subsystems positioned at various locations at the facility, or vice-versa. For example, a facility may operate multiple conveyors and each conveyor may be routed through various baggage handling location throughout the facility. A particular conveyor equipment may be positioned at a particular location of the facility for a particular conveyor, thus being represented by a specific cell 1050 of the grid.

The main screen 1000 of the user interface module 270 may also include related information regarding the performance of the industrial equipment. Examples of the related information include, but are not limited to, asset names, events, conformance information, and priority information.

FIG. 11 is a diagrammatic view of a corrective action screen 1100 of the user interface module 270, associated with data received from the corrective action module 230, in an example implementation. The corrective action screen 1100 includes one or more corrective steps 1110 recommended by the system 200 as well as a user selection 1120 for accepting or rejecting the recommendation. For some embodiments, the corrective action screen 1100 may include a rating 1130 associated with the corrective action recommendation. For some embodiments, the corrective action screen 1100 may include a priority indicator 1140 associated with the corrective action recommendation. For some embodiments, the corrective action screen 1100 may include additional information 1150, such as a video description, associated with the corresponding equipment or corrective action recommendation.

Figure 12:
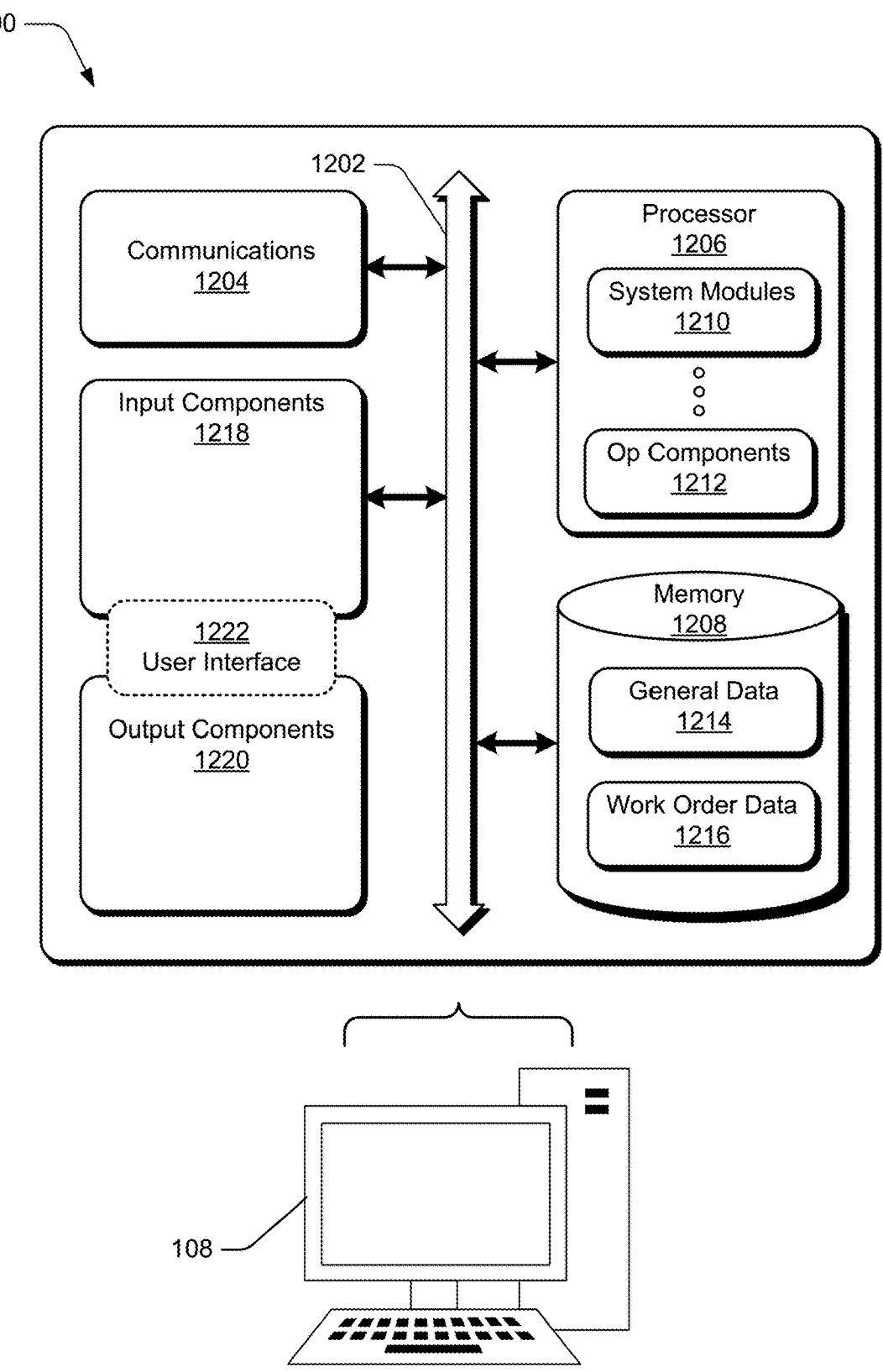
FIG. 12 is a block diagram representing devices of the environment of FIG. 1 in an example implementation that is operable to employ the techniques described herein.

FIG. 12 represents example device components 1200 of a computing device to determine desired baseline condition and prescribe corrective action to achieve a baseline condition in an example implementation. Accordingly, FIG. 12 is an example representation of each device, i.e., the edge server 114 or a combination of system devices 114, 118, 120, 126, 136. The device components 1200 comprise a communication bus 1202 for interconnecting other device components directly or indirectly. The other device components include one or more communication components 1204 communicating with other entities via a wired or wireless network, one or more processors 1206, and one or more memory components 1208.

The communication component 1204 is configured to receive data associated with one or more points, devices, or equipment of a facility. The communication component 1204 may utilize wired technology for communication, such as transmission of data over a physical conduit, e.g., an electrical or optical fiber medium. For some embodiments, the communication component 1204 may also utilize wireless technology for communication, such as radio frequency (RF), infrared, microwave, light wave, and acoustic communications. RF communications include, but are not limited to, Bluetooth (including BLE), ultrawide band (UM), Wi-Fi (including Wi-Fi Direct), Zigbee, cellular, satellite, mesh networks, PAN, WPAN, WAN, near-field communications, and other types of radio communications and their variants.

The processor or processors 1206 may execute code and process data received from other components of the device components 1200, such as information received at the communication component 1204 or stored at the memory component 1208. The code stored by the memory component 1208 may include, but is not limited to, operating systems, applications, modules, drivers, and the like. An operating system includes executable code that controls basic functions, such as interactions among the various components of the device components 1200, communication with external devices via the communication component 1204, and storage and retrieval of code and data to and from the memory component 1208.

Each application includes executable code to provide specific functionality for the processor 1206 and/or remaining components of the computing devices. Examples of applications executable by the processor 1206 include, but are not limited to, one or more system modules 1210 and/or one or more operational components 1212. Examples of system modules 1210 include, but are not limited to, a data consolidation module 210, optimal condition module 220, corrective action module 230, anomaly detection module 240, re-evaluation trigger module 250, system interface module 260, and/or a user interface module 270. Examples of operational components 1212 are explained further below in reference to FIG. 13 (such as a capturing baseline data component 1310, an IIOT/machine(s) data component 1320, a prediction/anomaly detection component 1330, and a user interface/external system component 1340).

Data stored at the memory component 1208 is information that may be referenced and/or manipulated by an operating system or application for performing functions of the computing devices. Examples of data stored by the memory component 1208 may include, but are not limited to, general data 1214 and work order data 1216. The general data 1214 includes information needed or desired to perform the general functions of the computing devices, such as IIOT/machine data such as structured and unstructured equipment time series data, maintenance data, equipment specifications and documentation, and the like. Examples of general data 1214 include, but are not limited to, structured equipment time series data, unstructured equipment time series data, maintenance data, equipment specifications, equipment documentation, system metadata, equipment metadata, operational data, and seasonality data. The work order data 1216 includes work orders received from a work order management system which, for some embodiments, may be ranked by dynamically validating the recommended corrective action and dynamically learning new corrective actions based on the work order ranking.

The device components 1200 may include one or more input components 1218 and one or more output components 1220. The input components 1218 and output components 1220 of the device components 1200 may include one or more visual, audio, mechanical, and/or other components. For some embodiments, the input and output components 1218, 1220 may include a user interface 1222 for interaction with a user of the device, such as the user interface module 270. The user interface 1222 may include a combination of hardware and software to provide a user with a desired user experience.

It is to be understood that FIG. 12 is provided for illustrative purposes only to represent examples of the device components 1200 and is not intended to be a complete diagram of the various components that may be utilized by the system. Therefore, the computing devices may include various other components not shown in FIG. 12, may include a combination of two or more components, or a division of a particular component into two or more separate components, and still be within the scope of the present invention.

Referring to FIG. 13, there is shown a block diagram of an operational system 1300 to determine desired baseline condition and prescribe corrective action to achieve a baseline condition in an example implementation, similar to the modular system 200 of FIG. 2. The operational system 1300 includes a capturing baseline data component 1310, an IIOT/machine(s) data component 1320, a prediction/anomaly detection component 1330, and a user interface/external system component 1340. The capturing baseline data component 1301 receives data related to the industrial equipment from various sources, i.e., the IIOT/machine(s) data component 1320, such as equipment time series data from the sensing components 102-112 as well as internal and external sources 124, 126, 360-390 of other related information. The prediction/anomaly detection component 1330 detects anomalies of the equipment operations and generates one or more baseline predictions based on the baseline data provided by the capturing baseline data component 1310. The results of the baseline predictions, as well as related operational information, are provided to a user interface of the system 1300. For some embodiments, the results and related information may be provided to one or more external systems.

Figure 14:
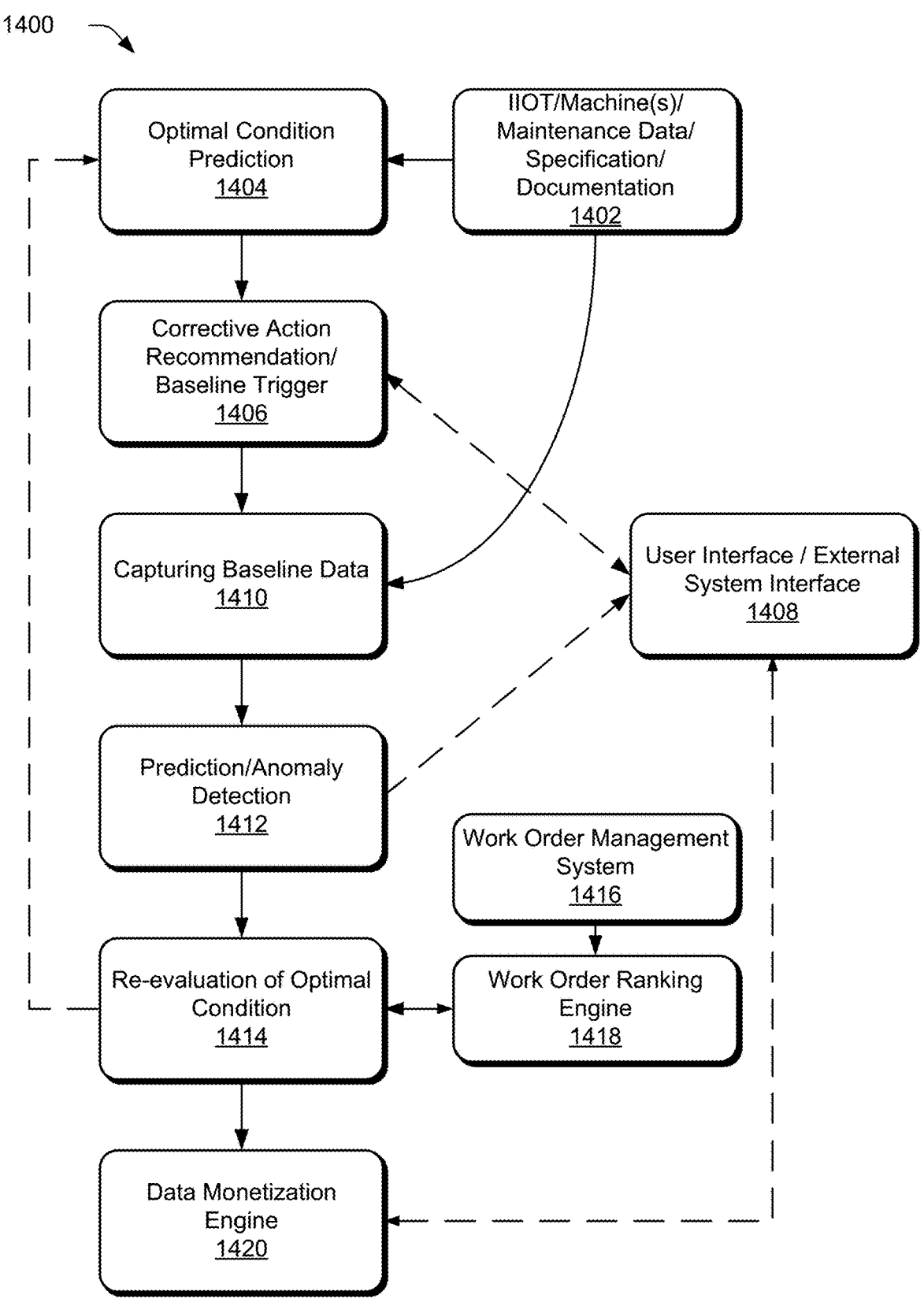
FIG. 14 is a flow diagram of a method to determine desired baseline condition and prescribe corrective action to achieve a baseline condition in an example implementation that is operable to employ the techniques described herein.

Referring to FIG. 14, there is shown a flow diagram of a method to determine desired baseline condition and prescribe corrective action to achieve a baseline condition in an example implementation. The system 200, 1300, such as the communication component, receives input data associated with one or more operating conditions of an equipment utilized for baseline activity 1402. In particular, the system 200, 1300 collects data as a predicted optimal operating condition for specific equipment, such as machines and systems, utilized for baseline activity. Examples of the data include, but are not limited to, IIOT/machine data such as structured and unstructured equipment time series data, maintenance data, equipment specifications and documentation, system metadata, equipment metadata, operational data, and seasonality data, and the like.

By determining a desired optimal condition, the system 200, 1300 determines the condition at which system baseline may be performed for condition monitoring, anomalies detection, and predictive maintenance systems. Thus, The system 200, 1300, such as one or more processors and/or devices, predicts an optimal operating condition based on at least one of a statistical model, a mathematical model, or a machine learning model of the equipment 1404. The processor(s) of the system 200, 1300 may determine a dynamic relationship with an equipment operating condition of the entire system and the optimal operating condition based on the at least one of the statistical model, the mathematical model, and the machine learning model the equipment. For some embodiments, the processor(s) may predict the optimal operating condition and the dynamic relationship based on the statistical model and the mathematical model. For some embodiments, the processor(s) may predict the optimal operating condition and the dynamic relationship based on the machine learning model. For some embodiments, the processor(s) may predict the optimal operating condition and the dynamic relationship based on the statistical model, the mathematical model, and the machine learning model.

The system 200, 1300, such as one or more processors or devices, may determine a corrective action recommendation based on the optimal operating condition in which the corrective action recommendation being associated with a system baseline 1406. In particular, the system 200, 1300 recommends the corrective action required to achieve the optimal condition which may be a key requirement to start the baseline process for condition monitoring. For some embodiments, the processor(s) may determine the corrective action recommendation based on the dynamic relationship with an equipment operating condition of the entire system and the optimal operating condition.

The corrective action recommendation may be baseline triggered by a user interface and/or external system interface 1406, 1408. In response to recommending corrective action 1406, the system 200, 1300 may capture baseline data 1410 and, thereafter, perform anomaly detection and predicted optimal condition 1412. The processor(s) of the system 200, 1300 may capturing the baseline data relating to the system baseline associated with the corrective action recommendation 1410. For some embodiments, the processor(s) may capture the baseline data in response to detecting an acceptance signal associated with the corrective action recommendation, such as being triggered by the user interface and/or the external system interface. The processor(s) may also provide the predicted optimal condition for the user interface and/or external system interface 1408.

In response to capturing baseline data 1410, the system 200, 1300, such as one or more processors or devices, may detect one or more anomalies of the baseline data deviating from the system baseline beyond a predetermined range 1412. For some embodiments, the processor(s) may determine that the anomaly or anomalies of the baseline data deviate from the system baseline beyond the acceptable range based on the system baseline of the optimal operating condition. The processor(s) may report the system baseline and the anomaly or anomalies to the user interface module, the external system interface, or both 1412, 1408.

The system 200, 1300, such as one or more processors or devices, may re-evaluate the optimal operating condition based on the anomaly or anomalies 1414. For some embodiments, the processor(s) may re-evaluate the optimal operating condition in response to information received from a work order management system 1414, 1416. In particular, the system 200, 1300 periodically or constantly re-evaluates the predicted optimal condition to recommend re-baseline and corrective action 1414 to achieve predicted optimal condition and to compensate for changing site conditions and ageing machine. While re-evaluating the predicted optimal condition 1414, the system 200, 1300 also learns new corrective actions in response to information received from a work order management system 1416. The information of the work order management system may be ranked by a work order ranking engine 1418 by dynamically validating the recommended corrective action and dynamically learning new corrective actions based on the work order ranking. Re-evaluation may be performed 1414 based on the ranked information. In response to re-evaluating the optimal condition 1414, the system 200, 1300 may return to determining a desired optimal condition, i.e., optimal condition prediction 1404. For some embodiments, the system 200, 1300 may include a data monetization engine to calculate potential savings and dynamically pricing the cost of enriched data 1420. For example, the calculated information may be shared with external system/end users IT system in a metered/unmetered connection to prove authenticity.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A postal mail handling system for corrective action to achieve baseline condition, comprising:

a communication component configured to receive input data associated with one or more operating conditions of postal mail handling equipment utilized for baseline activity and capture baseline data relating to a system baseline associated with a corrective action recommendation, wherein the input data includes seasonality data pertaining to postal mail handling; and a processor configured to predict an optimal operating condition based on at least one of a statistical model, a mathematical model, or a machine learning model of the postal mail handling equipment, determine the corrective action recommendation based on the optimal operating condition, execute the determined corrective action to achieve baseline condition, detect at least one anomaly from the baseline data deviating from the system baseline beyond a predetermined range, and re-evaluate the optimal operating condition based on the at least one anomaly;

wherein the corrective action recommendation is associated with the system baseline.

2. The postal mail handling system as described in claim 1, wherein:

the processor is configured to determine a dynamic relationship with an equipment operating condition of an entire system and the optimal operating condition based on the at least one of the statistical model, the mathematical model, and the machine learning model of the postal mail handling equipment; and the processor is configured to determine the corrective action recommendation based on the dynamic relationship.

3. The postal mail handling system as described in claim 1, wherein the input data further includes at least one of structured equipment time series data, unstructured equipment time series data, maintenance data, equipment specifications, equipment documentation, system metadata, equipment metadata, and operational data.

4. The postal mail handling system as described in claim 1, wherein the communication component is configured to capture the baseline data in response to detecting an acceptance signal associated with the corrective action recommendation.

5. The postal mail handling system as described in claim 1, wherein the processor is configured to determine whether the at least one anomaly of the baseline data deviates from the system baseline beyond the predetermined range based on the system baseline of the optimal operating condition.

6. The post mail handling system as described in claim 1, wherein the processor is configured to report the system baseline and the at least one anomaly to at least one of a user interface module or an external system interface.

7. The postal mail handling system as described in claim 1, wherein the processor is configured to re-evaluate the optimal operating condition in response to information received from a work order management system.

8. A postal mail handling method for corrective action to achieve baseline condition, the method comprising:

receiving input data associated with one or more operating conditions of postal mail handling equipment utilized for baseline activity, wherein the input data includes seasonality data pertaining to postal mail handling;

predicting an optimal operating condition based on at least one of a statistical model, a mathematical model, or a machine learning model of the postal mail handling equipment;

determining a corrective action recommendation based on the optimal operating condition, the corrective action recommendation being associated with a system baseline;

executing the determined corrective action to achieve baseline condition;

capturing baseline data relating to the system baseline associated with the corrective action recommendation;

detecting at least one anomaly of the baseline data deviating from the system baseline beyond a predetermined range; and re-evaluating the optimal operating condition based on the at least one anomaly.

9. The postal mail handling method as described in claim 8, further comprising:

determining a dynamic relationship with an equipment operating condition of an entire system and the optimal operating condition based on the at least one of the statistical model, the mathematical model, and the machine learning model of the postal mail handling equipment;

wherein determining the corrective action recommendation includes determining the corrective action recommendation based on the dynamic relationship.

10. The postal mail handling method as described in claim 8, wherein the input data further includes at least one of structured equipment time series data, unstructured equipment time series data, maintenance data, equipment specifications, equipment documentation, system metadata, equipment metadata, and operational data.

11. The postal mail handling method as described in claim 8, wherein capturing the baseline data includes capturing the baseline data in response to detecting an acceptance signal associated with the corrective action recommendation.

12. The postal mail handling method as described in claim 8, wherein detecting the at least one anomaly of the baseline data deviating from the system baseline beyond the predetermined range includes determining that the at least one anomaly of the baseline data deviates from the system baseline beyond the predetermined range based on the system baseline of the optimal operating condition.

13. The postal mail handling method as described in claim 8, further comprising reporting the system baseline and the at least one anomaly to at least one of a user interface module or an external system interface.

14. The postal mail handling method as described in claim 8, wherein re-evaluating the optimal operating condition includes re-evaluating the optimal operating condition in response to information received from a work order management system.

15. A non-transitory computer readable medium including executable instructions which, when executed, causes at least one processor to execute corrective action to achieve baseline condition for a postal mail handling system by:

receiving input data associated with one or more operating conditions of postal mail handling equipment uti-lized for baseline activity, wherein the input data includes seasonality data pertaining to postal mail handling;

predicting an optimal operating condition based on at least one of a statistical model, a mathematical model, or a machine learning model of the postal mail handling equipment;

determining a corrective action recommendation based on the optimal operating condition, the corrective action recommendation being associated with a system baseline;

executing the determined corrective action to achieve baseline condition;

capturing baseline data relating to the system baseline associated with the corrective action recommendation;

detecting at least one anomaly of the baseline data deviating from the system baseline beyond a predetermined range; and re-evaluating the optimal operating condition based on the at least one anomaly.

16. The non-transitory computer readable medium as described in claim 15, further comprising:

determining a dynamic relationship with an equipment operating condition of an entire system and the optimal operating condition based on the at least one of the statistical model, the mathematical model, and the machine learning model of the postal mail handling equipment;

wherein determining the corrective action recommendation includes determining the corrective action recommendation based on the dynamic relationship.

17. The non-transitory computer readable medium as described in claim 15, wherein the input data further includes at least one of structured equipment time series data, unstructured equipment time series data, maintenance data, equipment specifications, equipment documentation, system metadata, equipment metadata, and operational data.

18. The non-transitory computer readable medium as described in claim 15, wherein capturing the baseline data includes capturing the baseline data in response to detecting an acceptance signal associated with the corrective action recommendation.

19. The non-transitory computer readable medium as described in claim 15, wherein detecting the at least one anomaly of the baseline data deviating from the system baseline beyond the predetermined range includes determining that the at least one anomaly of the baseline data deviates from the system baseline beyond the predetermined range based on the system baseline of the optimal operating condition.

20. The non-transitory computer readable medium as described in claim 15, wherein re-evaluating the optimal operating condition includes re-evaluating the optimal operating condition in response to information received from a work order management system.

* * * * *